(12) United States Patent
Kawaoka et al.

(10) Patent No.: US 8,917,095 B2
(45) Date of Patent: Dec. 23, 2014

(54) VEHICLE SYSTEM AND METHOD FOR DETECTING HYDROGEN SULFIDE

(75) Inventors: Hirokazu Kawaoka, Nisshin (JP); Hiroshi Nagase, Susuno (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 417 days.

(21) Appl. No.: 13/515,072

(22) PCT Filed: Dec. 17, 2009

(86) PCT No.: PCT/JP2009/071050
§ 371 (c)(1),
(2), (4) Date: Jun. 11, 2012

(87) PCT Pub. No.: WO2011/074097
PCT Pub. Date: Jun. 23, 2011

(65) Prior Publication Data
US 2012/0286793 A1    Nov. 15, 2012

(51) Int. Cl.
*G01N 27/416* (2006.01)
*H01M 10/0562* (2010.01)
*H01M 2/10* (2006.01)
*H01M 2/30* (2006.01)
*H01M 2/34* (2006.01)
*H01M 4/36* (2006.01)
*H01M 4/38* (2006.01)
*H01M 4/525* (2010.01)
*H01M 10/052* (2010.01)
*H01M 10/44* (2006.01)
*H01M 10/48* (2006.01)

(52) U.S. Cl.
CPC ........ *H01M 10/0562* (2013.01); *H01M 2/1094* (2013.01); *H01M 2/305* (2013.01); *H01M 2/34* (2013.01); *H01M 4/364* (2013.01); *H01M 4/38* (2013.01); *H01M 4/525* (2013.01); *H01M 10/052* (2013.01); *H01M 10/44* (2013.01); *H01M 10/48* (2013.01); *Y02E 60/122* (2013.01)
USPC .................................................... 324/426

(58) Field of Classification Search
CPC ........... G01R 31/3648; G01R 31/3627; G01R 31/3662; G01R 31/3631; Y02E 60/12; Y02E 60/122; H01M 10/052; H01M 10/0565; H01M 6/181; H01B 1/122

USPC .......................................................... 324/426
See application file for complete search history.

(56) References Cited

U.S. PATENT DOCUMENTS

| | | | | |
|---|---|---|---|---|
| 5,552,244 | A | * | 9/1996 | Griffin et al. ................. 429/188 |
| 5,783,330 | A | * | 7/1998 | Naoi et al. ..................... 429/212 |
| 7,396,514 | B2 | * | 7/2008 | Hammel ........................ 422/168 |
| 2002/0068034 | A1 | * | 6/2002 | Schield et al. ................. 423/563 |
| 2004/0063215 | A1 | | 4/2004 | Horiuchi et al. |
| 2010/0178554 | A1 | | 7/2010 | Hama |
| 2010/0297479 | A1 | | 11/2010 | Tsuchida et al. |

FOREIGN PATENT DOCUMENTS

| | | |
|---|---|---|
| JP | A-2006-54189 | 2/2006 |
| JP | A-2009-32539 | 2/2009 |
| JP | A-2009-193727 | 8/2009 |
| WO | WO 03/029801 A1 | 4/2003 |

OTHER PUBLICATIONS

International Search Report issued in International Patent Application No. PCT/JP2009/071050 dated Feb. 16, 2010.

* cited by examiner

*Primary Examiner* — Arun Williams
(74) *Attorney, Agent, or Firm* — Oliff PLC

(57) ABSTRACT

A sulfide-based solid electrolyte cell which can efficiently detect its deterioration, a cell pack equipped with the cell, a vehicle system equipped with the cell pack, and a method for detecting hydrogen sulfide. A sulfide-based solid electrolyte cell including at least one or more power generation units each including a positive electrode, a negative electrode and an electrolyte present between the positive and negative electrodes, and a cell case which houses the power generation units, wherein at least one of the positive electrode, negative electrode and electrolyte includes a sulfur material, and wherein at least one of a current collector which constitutes a charging and discharging path, a lead which constitutes a charging and discharging path, and a lead which is connected to a circuit that is attached to the charging and discharging path, includes a material which chemically reacts with hydrogen sulfide to change electrical resistance.

7 Claims, 10 Drawing Sheets

VEHICLE SYSTEM AND METHOD FOR DETECTING HYDROGEN SULFIDE

TECHNICAL FIELD

The present invention relates to a vehicle system equipped with a sulfide-based solid electrolyte cell which can efficiently detect its deterioration, and a method for detecting hydrogen sulfide of the sulfide-based solid electrolyte cell.

BACKGROUND ART

A secondary battery is a battery which is able to provide electricity by converting a loss in chemical energy into electrical energy; moreover, it is a battery which is able to store (during charge) chemical energy by converting electrical energy into chemical energy by passing an electrical current in a direction that is opposite to the discharge direction. Among secondary batteries, lithium secondary batteries have higher energy density, so that they are widely used as a power source for notebook personal computers, cellular phones, etc.

In a lithium secondary battery using graphite ($C_6$) as the negative electrode active material, the reaction described by the following formula (1) proceeds at the negative electrode upon discharge:

$$C_6Li \rightarrow C_6 + Li^+ + e^- \quad (1)$$

An electron produced by the formula (1) passes through an external circuit, works by an external load, and then reaches the positive electrode. At the same time, a lithium ion ($Li^+$) produced by the formula (1) is transferred through the electrolyte sandwiched between the negative and positive electrodes from the negative electrode side to the positive electrode side by electro-osmosis.

When lithium cobaltate ($Li_{0.4}CoO_2$) is used as a positive electrode active material, a reaction described by the following formula (2) proceeds at the positive electrode upon discharge:

$$Li_{0.4}CoO_2 + 0.6Li^+ + 0.6e^- \rightarrow CoO_2 \quad (2)$$

Upon charging the battery, reactions which are reverse to the reactions described by the above formulae (1) and (2) proceed at the negative and positive electrodes. The graphite material in which lithium was intercalated ($C_6Li$) becomes reusable at the negative electrode, while lithium cobaltate ($Li_{0.4}CoO_2$) is regenerated at the positive electrode. Because of this, discharge becomes possible again.

Among lithium secondary batteries, a lithium battery all-solidified by using a solid electrolyte as the electrolyte, uses no combustible organic solvent in the battery; therefore, it is considered to be safe, able to simplify the device and excellent in production cost and productivity. A sulfide-based solid electrolyte is known as a solid electrolyte material used for such a lithium secondary battery.

However, a sulfide-based solid electrolyte material is likely to react with moisture. Because of this, a battery comprising a sulfide-based solid electrolyte material has a problem that a deterioration is likely to be caused to the battery by the generation of hydrogen sulfide, thereby shortening the lifetime of the battery.

Techniques for solving such a unique problem of the sulfide-based solid electrolyte material have been developed so far. Patent Literature 1 discloses a technique for an all-solid lithium secondary battery which uses a sulfide-based solid electrolyte material and has a power generation element in which an oxide layer substantially containing no moisture, which is obtained by oxidation of the sulfide-based solid electrolyte material, is formed in a part where electrolyte-containing layers containing at least the sulfide-based solid electrolyte material is in contact with external air.

CITATION LIST

Patent Literature

[Patent Literature 1] Japanese Patent Application Laid-Open (JP-A) No. 2009-193727

SUMMARY OF INVENTION

Technical Problem

The all-solid lithium secondary battery disclosed in Patent Literature 1 has the power generation element containing the oxide layer which substantially contains no moisture in addition to the electrolyte-containing layers containing the sulfide-based solid electrolyte material, so that the battery production process is required to newly have a production step of the power generation element containing the oxide layer and an installation step of the element. Therefore, there is a problem that the production process is complicated and high in cost.

The present invention was made in view of the above circumstances, and it is an object of the present invention to provide a sulfide-based solid electrolyte cell which can efficiently detect its deterioration, a cell pack equipped with the cell, a vehicle system equipped with the cell pack, and a method for detecting hydrogen sulfide.

Solution to Problem

The sulfide-based solid electrolyte cell of the present invention comprises at least one or more power generation units each comprising a positive electrode, a negative electrode and an electrolyte present between the positive and negative electrodes, and a cell case which houses the power generation units, wherein at least one of the positive electrode, the negative electrode and the electrolyte comprises a sulfur material, and wherein at least one of a current collector which constitutes a charging and discharging path, a lead which constitutes a charging and discharging path, and a lead which is connected to a circuit that is attached to the charging and discharging path, comprises a material which chemically reacts with hydrogen sulfide to change electrical resistance.

In the sulfide-based solid electrolyte cell having such a structure, since current-collecting components which constitute the charging and discharging path, the lead which is connected to the attached circuit, etc. contain the material which chemically reacts with hydrogen sulfide to change electrical resistance, even if the sulfur material is reacted with moisture inside or outside the cell to generate hydrogen sulfide, the electrical resistance of the current-collecting components, etc. is changed. Therefore, the generation of hydrogen sulfide can be easily detected, thereby preventing a deterioration in the cell caused by hydrogen sulfide.

In the sulfide-based solid electrolyte cell of the present invention, the material which chemically reacts with hydrogen sulfide to change electrical resistance is preferably one or more metals selected from the group consisting of copper, nickel, iron, molybdenum, gold, silver, silicon, germanium, samarium, zirconium, tin, tantalum, lead, niobium, nickel, neodymium, platinum, hafnium, palladium, magnesium, manganese, molybdenum and lanthanum, or an alloy that is a combination thereof.

In the sulfide-based solid electrolyte cell having such a structure, the current-collecting components which constitute the charging and discharging path, the lead which is connected to the attached circuit, etc. contain the metal which chemically reacts with hydrogen sulfide to significantly increase electrical resistance. Therefore, the generation of hydrogen sulfide can be more easily detected.

As an embodiment of the sulfide-based solid electrolyte cell of the present invention, the sulfide-based solid electrolyte cell may have a structure that the lead which constitutes the charging and discharging path is a lead which connects the power generation units, and the lead which is connected to the circuit attached to the charging and discharging path is a lead which connects the power generation unit(s) and the attached circuit.

In the sulfide-based solid electrolyte cell of the present invention, the current collector which constitutes the charging and discharging path, the lead which constitutes the charging and discharging path, or the lead which is connected to the circuit attached to the charging and discharging path is preferably a current collector or lead which is present in a range that hydrogen sulfide generated from the power generation unit(s) reaches.

In the sulfide-based solid electrolyte cell having such a structure, the current collector or lead is present in the range that hydrogen sulfide generated from the power generation unit(s) reaches. Therefore, the generation of hydrogen sulfide can be early and accurately detected.

The sulfide-based solid electrolyte cell pack of the present invention comprises one or more sulfide-based solid electrolyte cells.

As an embodiment of the sulfide-based solid electrolyte cell pack of the present invention, the sulfide-based solid electrolyte cell pack may have a structure that the lead which constitutes the charging and discharging path is a lead selected from the group consisting of a lead which connects the sulfide-based solid electrolyte cells, a lead which connects the sulfide-based solid electrolyte cell packs and a lead which connects the sulfide-based solid electrolyte cell pack and a component outside the cell pack, and wherein the lead which is connected to the circuit attached to the charging and discharging path is a lead which connects the sulfide-based solid electrolyte cell and the attached circuit or a lead which connects the sulfide-based solid electrolyte cell pack and the attached circuit.

In the sulfide-based solid electrolyte cell pack of the present invention, the current collector which constitutes the charging and discharging path, the lead which constitutes the charging and discharging path, or the lead which is connected to the circuit attached to the charging and discharging path is preferably a current collector or lead which is present in the range that hydrogen sulfide generated from the power generation unit(s) reaches.

The vehicle system of the present invention comprises one or more of the sulfide-based solid electrolyte cells, one or more of the sulfide-based solid electrolyte cell packs, or one or more of the sulfide-based solid electrolyte cells and one or more of the sulfide-based solid electrolyte cell packs.

The method for detecting hydrogen sulfide of the present invention is a method for detecting hydrogen sulfide in the sulfide-based solid electrolyte cell, the sulfide-based solid electrolyte cell pack, or the vehicle system, the method comprising the steps of:

determining whether a voltage response is normal or not when the sulfide-based solid electrolyte cell is charged or discharged for a predetermined time at a predetermined electrical current, or whether an electrical current response is normal or not when the sulfide-based solid electrolyte cell is charged or discharged for a predetermined time at a predetermined voltage;

determining whether a voltage change or an electrical current change is within a normal range or not when a predetermined electrical current waveform or a predetermined voltage waveform is applied to the sulfide-based solid electrolyte cell upon maintaining the vehicle system or upon producing the sulfide-based solid electrolyte cell, the sulfide-based solid electrolyte cell pack or the vehicle system; and determining whether a difference is present or not upon running the vehicle system between a cell voltage of the sulfide-based solid electrolyte cell upon the running and a cell voltage which is estimated from a cell voltage map according to usage of the sulfide-based solid electrolyte cell in the vehicle system.

Advantageous Effects of Invention

According to the present invention, since current-collecting components which constitute the charging and discharging path, the lead which is connected to the attached circuit, etc. contain the material which chemically reacts with hydrogen sulfide to change electrical resistance, even if the sulfur material is reacted with moisture inside or outside the cell to generate hydrogen sulfide, the electrical resistance of the current-collecting components, etc. is changed. Therefore, the generation of hydrogen sulfide can be easily detected, thereby preventing a deterioration in the cell caused by hydrogen sulfide.

DESCRIPTION OF EMBODIMENTS

1. Sulfide-Based Solid Electrolyte Cell

Figure 1:
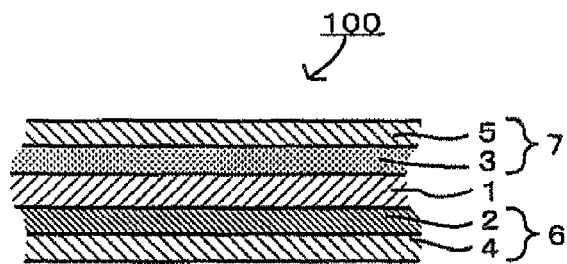
FIG. 1 is a view showing an example of a stacking structure of an all-solid lithium secondary battery which is a power generation unit used for the sulfide-based solid electrolyte cell of the present invention, and is also a schematic view showing a section of the battery cut along the stacking direction.

The sulfide-based solid electrolyte cell of the present invention comprises at least one or more power generation units each comprising a positive electrode, a negative electrode and an electrolyte present between the positive electrode and negative electrodes, and a cell case which houses the power generation units, wherein at least one of the positive electrode, the negative electrode and the electrolyte comprises a sulfur material, and wherein at least one of a current collector which constitutes a charging and discharging path, a lead which constitutes a charging and discharging path, and a lead which is connected to a circuit that is attached to the charging and discharging path, comprises a material which chemically reacts with hydrogen sulfide to change electrical resistance.

In the present invention, the "sulfur material" is not particularly limited as long as it is a material which comprises a sulfur atom in a molecular structure. A specific example of the sulfur material includes a sulfide-based solid electrolyte. The sulfur material of the present invention may be contained in at least one of the positive electrode, the negative electrode and the electrolyte. Especially in the case of the positive electrode, the sulfur material is preferably contained in a positive electrode active material layer. Especially in the case of the negative electrode, the sulfur material is preferably contained in a negative electrode active material layer.

In the present invention, the "material which chemically reacts with hydrogen sulfide to change electrical resistance" means a material which chemically reacts with hydrogen sulfide to increase and/or decrease electrical resistance. As the above-described material, both inorganic and organic materials can be used. In the present invention, the material is preferably a metallic material having high conductive property from the point of view that the material is used for the current collector which constitutes the charging and discharging path, the lead which constitutes the charging and discharging path, and the lead which is connected to the circuit attached to the charging and discharging path.

As such a "material which chemically reacts with hydrogen sulfide to change electrical resistance", in particular, it is preferable to use a metallic material having 110% or more increasing rate of electrical resistance caused by the chemical reaction with hydrogen sulfide, it is particularly preferable to use a metallic material having 150% or more increasing rate of electrical resistance caused by the chemical reaction with hydrogen sulfide.

In the present invention, the "power generation unit" is a power generation unit comprising at least the positive electrode, the negative electrode and the electrolyte present between the positive and negative electrodes, and is not particularly limited as long as at least one of the positive electrode, the negative electrode and the electrolyte comprises the sulfur material. In particular, there may be mentioned an all-solid lithium secondary battery comprising a sulfide-based solid electrolyte, a sodium-sulfur battery comprising a sulfide-based solid electrolyte and a lithium-sulfur battery comprising a sulfide-based solid electrolyte.

In the present invention, as the "lead which constitutes the charging and discharging path", in particular, there may be mentioned a lead which connects the power generation units.

In the present invention, as the "lead which is connected to the circuit that is attached to the charging and discharging path", in particular, there may be mentioned a lead which connects the power generation unit (s) and the attached circuit.

From the point of view that the generation of hydrogen sulfide can be early and accurately detected, the current collector which constitutes the charging and discharging path, the lead which constitutes the charging and discharging path, or the lead which is connected to the circuit attached to the charging and discharging path is preferably a current collector or lead which is present in the range that hydrogen sulfide generated from the power generation unit(s) reaches.

As the range that hydrogen sulfide reaches, in particular, there may be mentioned the inside of a cell. However, any position outside the cell is included in the range when it is around the cell and, in view of the exterior material of the cell, when hydrogen sulfide could reach the position.

FIG. 1 is a view showing an example of a stacking structure of an all-solid lithium secondary battery which is a power generation unit used for the sulfide-based solid electrolyte cell of the present invention, and is also a schematic view showing a section of the battery cut along the stacking direction. The power generation unit used in the present invention is not limited to the above example.

All-solid lithium secondary battery 100 comprises positive electrode 6 comprising positive electrode active material layer 2 and positive electrode current collector 4, negative electrode 7 comprising negative electrode active material layer 3 and negative electrode current collector 5, and lithium ion-conducting solid electrolyte 1 present between positive electrode 6 and negative electrode 7.

Hereinafter, a positive electrode, a negative electrode, a lithium ion-conducting solid electrolyte and other components such as a separator, etc. will be described in order, which are components for the all-solid lithium secondary battery used in the present invention.

(Positive and Negative Electrodes)

The positive electrode used in the present invention comprises a positive electrode current collector and a positive electrode lead which is directly or indirectly connected to the positive electrode current collector. Preferably, the positive electrode further comprises a positive electrode active material layer containing a positive electrode active material. The negative electrode used in the present invention comprises a negative electrode current collector and a negative electrode lead which is directly or indirectly connected to the negative electrode current collector. Preferably, the negative electrode further comprises a negative electrode active material layer containing a negative electrode active material.

As the positive electrode active material used in the present invention, in particular, there may be mentioned $LiCoO_2$, $LiNi_{1/3}Mn_{1/3}Co_{1/3}O_2$, $LiNiPO_4$, $LiMnPO_4$, $LiNiO_2$, $LiMn_2O_4$, $LiCoMnO_4$, $Li_2NiMn_3O_8$, $Li_3Fe_2(PO_4)_3$ and $Li_3V_2(PO_4)_3$. Among them, $LiCoO_2$ is preferably used as the positive electrode active material in the present invention.

The thickness of the positive electrode active material layer used in the present invention varies depending on the intended application of the all-solid lithium secondary battery, etc. However, the thickness of the positive electrode active material layer is preferably in the range of 5 μm to 250 μm, particularly preferably in the range of 20 μm to 200 μm, most preferably in the range of 30 μm to 150 μm.

The average particle diameter of the positive electrode active material is, for example, in the range of 1 μm to 50 μm, preferably in the range of 1 μm to 20 μm, particularly preferably in the range of 3 μm to 5 μm. This is because it could be difficult to handle the positive electrode active material when the average particle diameter of the material is too small, and it could be difficult to make the positive electrode active material layer a flat layer when the average particle diameter of the positive electrode active material is too large. The average particle diameter of the positive electrode active material can be obtained by, for example, measuring the diameter of active material carrier particles observed with a scanning electron microscope (SEM) and averaging the thus-obtained diameters.

As needed, the positive electrode active material layer can contain a conducting material, a binder, etc.

The conducting material contained in the positive electrode active material layer used in the present invention is not particularly limited as long as it can increase the conductivity of the positive electrode active material layer. As the conducting material, for example, there may be mentioned carbon black such as acetylene black or ketjen black. The content of the conducting material in the positive electrode active material layer varies depending on the type of conducting material, and it is normally in the range of 1% by mass to 10% by mass.

As the binder contained in the positive electrode active material layer used in the present invention, for example, there may be mentioned polyvinylidene fluoride (PVDF), polytetrafluoroethylene (PTFE), etc. The content of the binder in the positive electrode active material layer can be an amount which can fix the positive electrode active material, etc., and it is preferably as small as possible. The content of the binder is normally in the range of 1% by mass to 10% by mass.

The positive electrode current collector used in the present invention is not particularly limited as long as it functions to collect current from the positive electrode active material layer. Therefore, it is not always necessary for the positive electrode current collector to directly and electrically connect to the positive electrode active material layer. Even if the positive electrode current collector is indirectly connected to the positive electrode active material layer, it is included in the "positive electrode current collector" of the present invention, if it functions to collect current from the positive electrode active material layer, and is an electrical conductor which constitutes a charging and discharging path.

As the material for the positive electrode current collector, for example, there may be mentioned aluminum, SUS, nickel, iron and titanium. Among them, aluminum and SUS are preferred. As the form of the positive electrode current collector, there may be mentioned a foil form, a plate form and a mesh form, for example. Among them, a foil form is preferred.

As the electrolyte for positive electrode contained in the positive electrode used in the present invention, a solid electrolyte can be used. As the solid electrolyte, in particular, there can be used a solid oxide-based electrolyte, a solid sulfide-based electrolyte, etc. that will be described hereinafter.

After the positive electrode active material layer is formed, the layer can be pressed to increase electrode density.

The negative electrode active material used for the negative electrode active material layer is not particularly limited as long as it can store and release a lithium ion. For example, there may be mentioned a metallic lithium, a lithium alloy, a metal oxide, a metal sulfide, a metal nitride and a carbonaceous material such as graphite. The negative electrode active material can be in a powder form or thin film form.

As needed, the negative electrode active material layer can comprise a conducting material, a binder, etc.

As the conducting material and binder, those that are described above can be used. It is preferable to appropriately select the used amount of the binder and conducting material depending on the intended application of the all-solid lithium secondary battery, etc. The thickness of the negative electrode active material layer is not particularly limited. For example, it is in the range of 5 μm to 150 μm, preferably in the range of 10 μm to 80 μm.

As the electrolyte for negative electrode contained in the negative electrode used in the present invention, a solid electrolyte can be used. As the solid electrolyte, in particular, there can be used a solid oxide-based electrolyte, a solid sulfide-based electrolyte, etc. that will be described hereinafter.

As the material and shape of the negative electrode current collector, those that are the same as the materials and shapes of the positive electrode current collector described above, can be used.

As the production method of the negative electrode used in the present invention, those that are the same as the positive electrode production methods described above, can be used.

The attached circuit may be connected to at least one of the positive electrode current collector and the negative electrode current collector used in the present invention. The attached circuit refers to a circuit which does not directly contribute to an electrode reaction. The attached circuit is preferably a circuit which indirectly controls power generation performance. For example, there may be mentioned a voltage detecting circuit, a voltage equalization circuit, etc. In the present invention, the material which chemically reacts with hydrogen sulfide to change electrical resistance can be used for the attached circuit.

(Lithium Ion-Conducting Solid Electrolyte)

The lithium ion-conducting solid electrolyte used in the present invention performs lithium ion exchange between the above-described positive electrode active material and the negative electrode active material. As the solid electrolyte, in particular, there may be mentioned a solid oxide-based electrolyte, a solid sulfide-based electrolyte, etc.

As the solid oxide-based electrolyte, in particular, there may be mentioned LiPON (lithium phosphorus oxynitride), $Li_{1.3}Al_{0.3}Ti_{0.7}(PO_4)_3$, $La_{0.51}Li_{0.34}TiO_{0.74}$, $Li_3PO_4$, $Li_2SiO_2$, $Li_2SiO_4$, $Li_{0.5}La_{0.5}TiO_3$, $Li_{1.5}Al_{0.5}Ge_{1.5}(PO_4)_3$, etc.

As the solid sulfide-based electrolyte, in particular, there may be mentioned $Li_2S$—$P_2S_5$, $Li_2S$—$P_2S_3$, $Li_2S$—$P_2S_3$—$P_2S_5$, $Li_2S$—$SiS_2$, $LiI$—$Li_2S$—$P_2S_5$, $LiI$—$Li_2S$—$SiS_2$—$P_2S_5$, $Li_2S$—$SiS_2$—$Li_4SiO_4$, $Li_2S$—$SiS_2$—$Li_3PO_4$, $Li_3PS_4$—$Li_4GeS_4$, $Li_{3.4}P_{0.6}Si_{0.4}S_4$, $Li_{3.25}P_{0.25}Ge_{0.76}S_4$, $Li_{4-x}Ge_{1-x}P_xS_4$, $Li_7P_3S_{11}$, etc.

As described above, one of the main features of the present invention is that at least one of the positive electrode, the negative electrode and the electrolyte contains the sulfur material. As one of the specific examples of the sulfur material, there may be mentioned the above-described solid sulfide-based electrolyte.

(Other Components)

A separator can be used for the all-solid lithium secondary battery as other component. The separator is provided between the above-described positive and negative electrode current collectors. In general, it functions to prevent the contact between the positive and negative electrode active material layers and to retain the solid electrolyte. As the material for the separator, for example, there may be mentioned resins such as polyethylene (PE), polypropylene (PP), polyester, cellulose and polyamide. Among them, polyethylene and polypropylene are preferred. The structure of the separator can be a monolayer or multilayer structure. Examples of the separator having a multilayer structure include a separator having a two-layer structure (PE/PP) and a separator having a three-layer structure (PP/PE/PP). Also in the present invention, the separator can be a nonwoven fabric such as a resin nonwoven fabric or glass fiber nonwoven fabric. The thickness of the separator is not particularly limited and is the same as the thickness of the separator which is used for general all-solid lithium secondary batteries.

Also, a cell case for housing the all-solid lithium secondary battery can be used as other component. The form of the cell case is not particularly limited as long as it can house the positive electrode, the negative electrode, the solid electrolyte, etc. In particular, there may be mentioned a cylinder form, a square form, a coin form, a laminate form, etc.

Hereinafter, typical examples of the cell of the present invention will be described. The typical examples that will be described hereinafter are examples in the case where a positive electrode current collector, a negative electrode current collector, an electrode lead which is directly connected to those collectors, a voltage detecting circuit or a voltage equalization circuit contains a material which chemically reacts with hydrogen sulfide to change electrical resistance.

Figure 2:
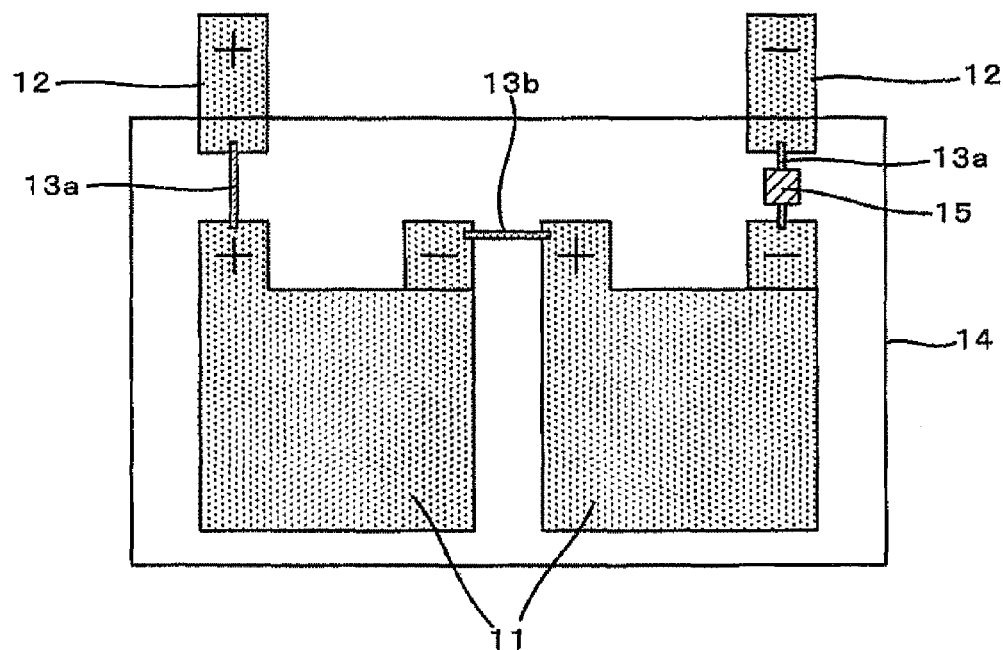
FIG. 2 is a schematic view of a first typical example of the cell of the present invention.

FIG. 2 is a schematic view of a first typical example of the cell of the present invention. "+" and "−" in the figure refer to positive and negative electrodes, respectively.

The cell of the first typical example comprises two or more power generation units 11, each of which has two electrodes. A first electrode of each power generation unit 11 is directly and electrically connected to cell terminal 12 by lead 13a. Second electrodes of power generation units 11 are directly and electrically connected to one another by lead 13b. Also in the cell of the first typical example, components other than part of cell terminal 12 are sealed in cell case 14. Herein, power generation unit 11 is a power generation unit containing a sulfide-based solid electrolyte. In particular, power generation unit 11 is a power generation unit for an all-solid battery using the sulfide-based solid electrolyte. Whether power generation unit 11 is a wound body or a stacked body, either the wound body or stacked body can be used. In FIGS. 2 to 6, cell case 14 is drawn as a transparent cell case to describe the cell pack structure.

In addition, in the cell of the first typical example, lead 13a contains member 15 containing the material which chemically reacts with hydrogen sulfide to change electrical resistance. In this case, the cell may have a structure in which lead 13a is covered with a material which does not react with hydrogen sulfide and part of lead 13a is exposed. In FIG. 2, member 15 is overdrawn to describe an installation position of member 15. However, an actual size of member 15 is not necessary to be such a large size.

When hydrogen sulfide is generated at power generation unit 11, electrical resistance of part containing member 15 of lead 13a is changed. By comparing an electrical current value and voltage value after the electrical resistance is changed with a map of an electrical current response to a voltage control and a voltage response to an electrical current control, the generation of hydrogen sulfide can be detected. If hydrogen sulfide is further generated at power generation unit 11, the flow of an electrical current is halted by the meltdown of lead 13a caused by a resistance increase or heat generation due to resistance, resulted in stopping the electrode reaction. Therefore, swelling, etc. of the cell caused by hydrogen sulfide gas, which are unavoidable in the conventional art, can be prevented. Thereby, power generation having high safety can be performed.

Figure 3:
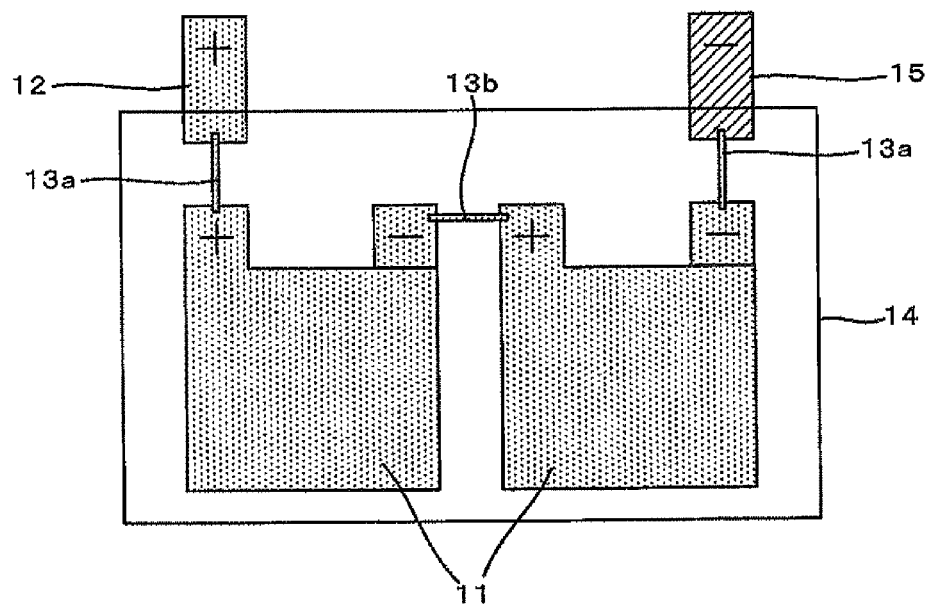
FIG. 3 is a schematic view of a second typical example of the cell of the present invention.

FIG. 3 is a schematic view of a second typical example of the cell of the present invention. The cell of the second typical example is the same as that of the above-described first typical example, except the position of member 15 containing the material which chemically reacts with hydrogen sulfide to change electrical resistance.

In the cell of the second typical example, cell terminal 12 contains member 15 containing the material which chemically reacts with hydrogen sulfide to change electrical resistance. In this case, the cell may have a structure in which cell terminal 12 is covered with the material which does not react with hydrogen sulfide and part of cell terminal 12 is exposed.

When hydrogen sulfide is generated at power generation unit 11, electrical resistance of part containing member 15 of cell terminal 12 is changed. By comparing an electrical current value and voltage value after the electrical resistance is changed with the map of the electrical current response to voltage control and the voltage response to electrical current control, the generation of hydrogen sulfide can be detected. Thereby, power generation having high safety can be performed similarly as in the cell of the first typical example.

Figure 4:
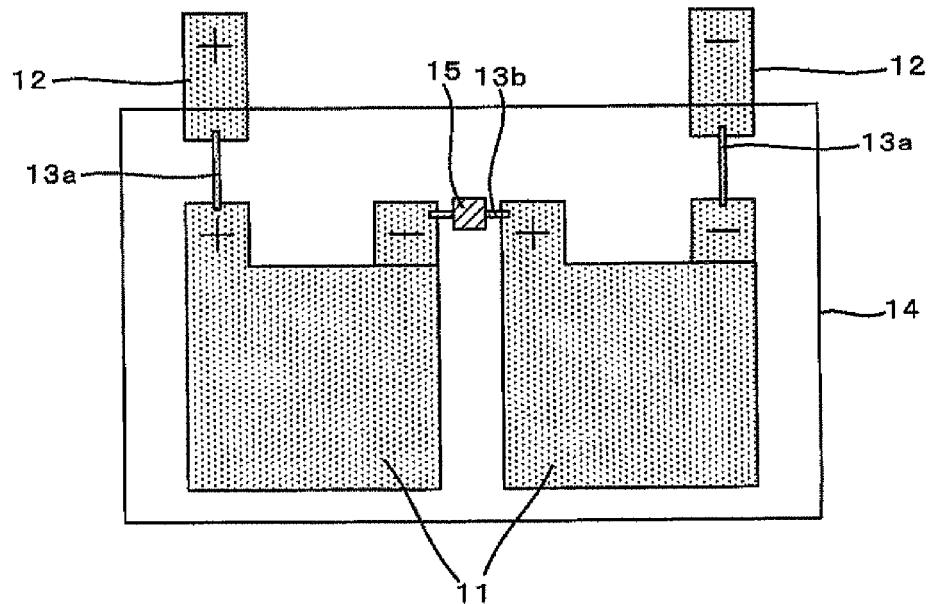
FIG. 4 is a schematic view of a third typical example of the cell of the present invention.

FIG. 4 is a schematic view of a third typical example of the cell of the present invention. The cell of the third typical example is the same as that of the above-described first typical example, except the position of member 15 containing the material which chemically reacts with hydrogen sulfide to change electrical resistance.

In the cell of the third typical example, lead 13b contains member 15 containing the material which chemically reacts with hydrogen sulfide to change electrical resistance. In this case, the cell may have a structure in which lead 13b is covered with the material which does not react with hydrogen sulfide and part of lead 13b is exposed. In FIG. 4, member 15 is overdrawn to describe the installation position of member 15. However, the actual size of member 15 is not necessary to be such a large size.

When hydrogen sulfide is generated at power generation unit 11, electrical resistance of part containing member 15 of lead 13b is changed. By comparing an electrical current value and voltage value after the electrical resistance is changed with the map of the electrical current response to voltage control and the voltage response to electrical current control, the generation of hydrogen sulfide can be detected. Thereby, power generation having high safety can be performed similarly as in the cell of the first typical example.

Figure 5:
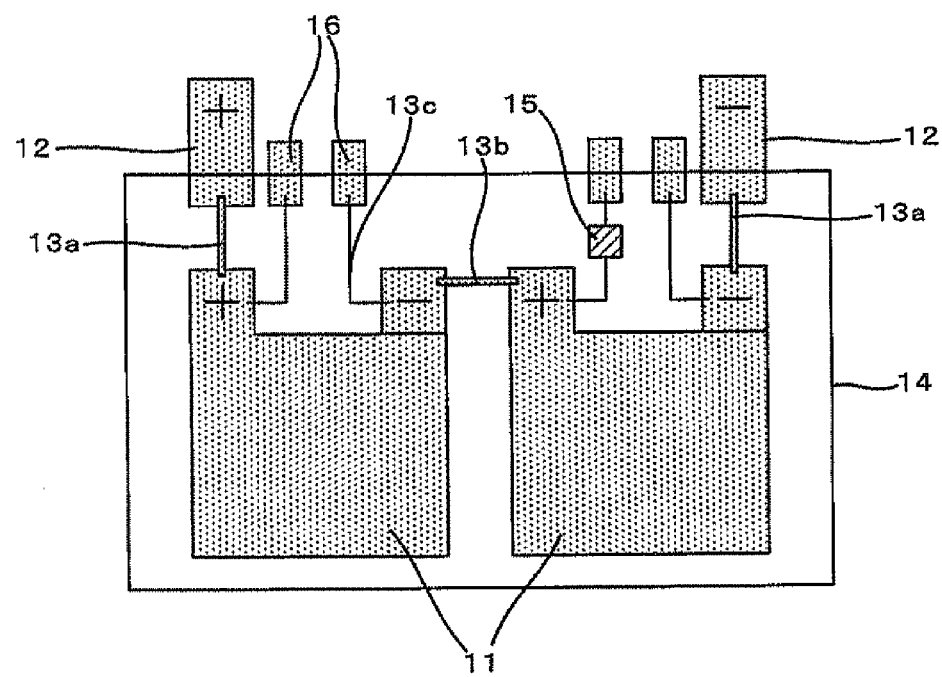
FIG. 5 is a schematic view of a fourth typical example of the cell of the present invention.

FIG. 5 is a schematic view of a fourth typical example of the cell of the present invention.

The cell of the fourth typical example comprises two or more power generation units 11, each of which has two electrodes. A first electrode of each power generation unit 11 is directly and electrically connected to cell terminal 12 by lead 13a. Second electrodes of power generation units 11 are directly and electrically connected to one another by lead 13b. The cell of the fourth typical example further comprises voltage detecting circuits 16 or voltage equalization circuits 16. Each electrode of each power generation unit 11 is electrically connected to each circuit 16 by lead 13c.

Also in the cell of the fourth typical example, components other than part of cell terminal 12 and part of circuits 16 are sealed in cell case 14. Herein, power generation unit 11 is a power generation unit containing a sulfide-based solid electrolyte. In particular, it is a power generation unit for an all-solid battery using the sulfide-based solid electrolyte. Whether power generation unit 11 is a wound body or a stacked body, either the wound body or stacked body can be used.

In addition, in the cell of the fourth typical example, lead 13c contains member 15 containing the material which chemically reacts with hydrogen sulfide to change electrical resistance. In this case, the cell may have a structure in which lead 13c is covered with the material which does not react with hydrogen sulfide and part of lead 13c is exposed.

When hydrogen sulfide is generated at power generation unit 11, electrical resistance of part containing member 15 of lead 13c is changed. By comparing an electrical current value and voltage value after the electrical resistance is changed with the map of the electrical current response to voltage control and the voltage response to electrical current control, the generation of hydrogen sulfide can be detected, and swelling, etc. of the cell caused by hydrogen sulfide gas, which are unavoidable in the conventional art, can be prevented. Thereby, power generation having high safety can be performed.

Figure 6:
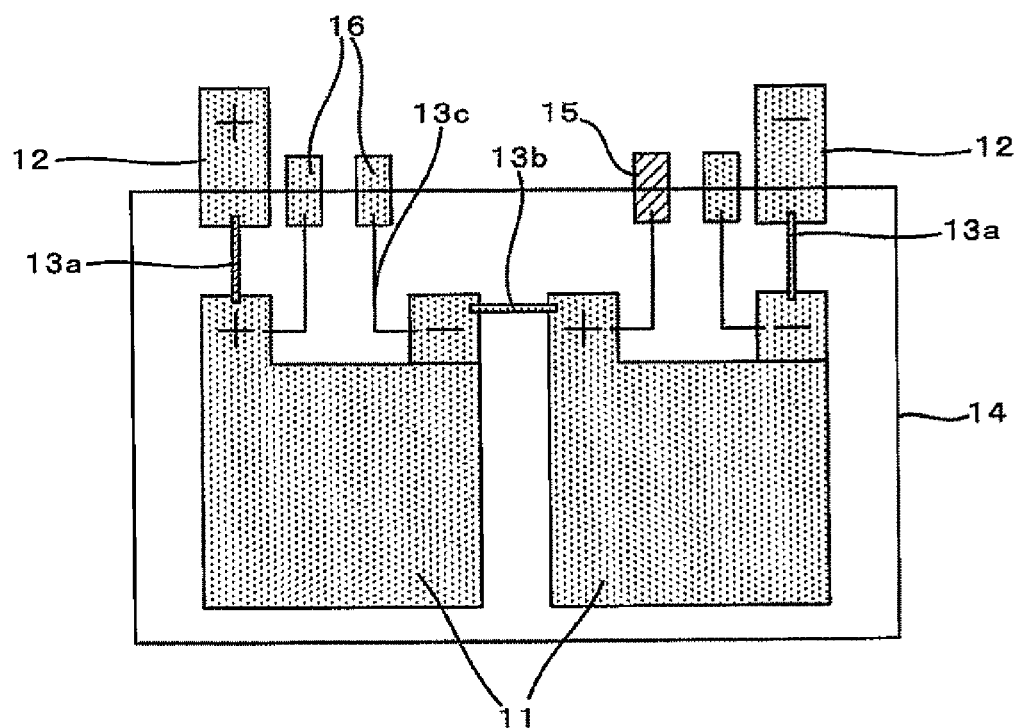
FIG. 6 is a schematic view of a fifth typical example of the cell of the present invention.

FIG. 6 is a schematic view of a fifth typical example of the cell of the present invention. The cell of the fifth typical example is the same as that of the above-described fourth typical example, except the position of member 15 containing the material which chemically reacts with hydrogen sulfide to change electrical resistance.

In the cell of the fifth typical example, voltage detecting circuits 16 or voltage equalization circuits 16 contain member 15 containing the material which chemically reacts with hydrogen sulfide to change electrical resistance. In this case, the cell may have a structure in which circuits 16 are covered with the material which does not react with hydrogen sulfide and parts of circuits 16 are exposed.

When hydrogen sulfide is generated at power generation unit 11, electrical resistance of part containing member 15 of cell terminal 12 is changed. By comparing electrical current value and voltage value after the electrical resistance is changed with the map of the electrical current response to voltage control and the voltage response to electrical current control, the generation of hydrogen sulfide can be detected. Thereby, power generation having high safety can be performed similarly as in the above-described cell of the fourth typical example.

2. Sulfide-Based Solid Electrolyte Cell Pack

The sulfide-based solid electrolyte cell pack of the present invention comprises one or more sulfide-based solid electrolyte cells.

Hereinafter, the sulfide-based solid electrolyte cell pack may be referred as to a cell pack.

In the present invention, as the "lead which constitutes the charging and discharging path", in particular, there may be mentioned a lead which connects the above-described sulfide-based solid electrolyte cells, a lead which connects the sulfide-based solid electrolyte cell packs, and a lead which connects the sulfide-based solid electrolyte cell pack and a component outside the cell pack. Herein, the "component other than the cell pack" specifically refers to a driving mechanism or the like which is operated by electric power supplied by the cell.

In the present invention, as the "lead which is connected to a circuit that is attached to a charging and discharging path", in particular, there may be mentioned a lead which connects the sulfide-based solid electrolyte cell and the attached circuit, a lead which connects the sulfide-based solid electrolyte cell pack and the attached circuit, etc.

From the point of view that the generation of hydrogen sulfide can be early and accurately detected, the current collector which constitutes the charging and discharging path, the lead which constitutes the charging and discharging path, or the lead which is connected to the circuit attached to the charging and discharging path is preferably a current collector or lead which is present in the range that hydrogen sulfide generated from the power generation unit (s) reaches.

As the range that hydrogen sulfide reaches, in particular, there may be mentioned the inside of a cell pack. However, any position outside the cell pack is included in the range when it is around the cell pack and, in view of the exterior material of the cell pack, when hydrogen sulfide could reach the position such as the inside of the vehicle system equipped with the cell pack of the present invention.

Hereinafter, typical examples of the cell pack of the present invention will be described.

Figure 7:
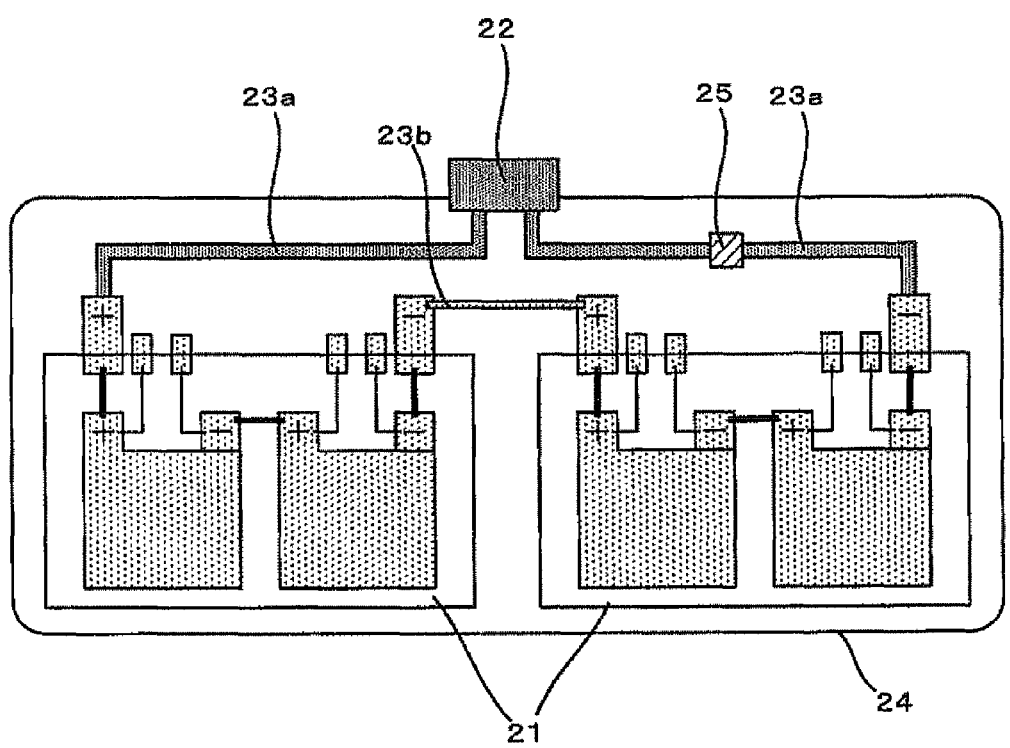
FIG. 7 is a schematic view of a first typical example of the cell pack of the present invention.

FIG. 7 is a schematic view of a first typical example of the cell pack of the present invention.

The cell pack of the first typical example comprises two or more cells 21, each of which has two cell terminals. A first cell terminal of each cell 21 is directly and electrically connected to terminal area 22 of the cell pack by lead 23a. Second cell terminals of cells 21 are directly and electrically connected to one another by lead 23b. Also in the cell pack of the first typical example, components other than part of terminal area 22 of the cell pack are sealed in cell case 24. Herein, as cell 21, the above-described cell in the typical example of the present invention can be used. In FIGS. 7 to 10, cell case 24 is drawn as a transparent cell case to describe the cell pack structure.

In addition, in the cell pack of the first typical example, lead 23a contains member 25 containing the material which chemically reacts with hydrogen sulfide to change electrical resistance. In this case, the cell pack may have a structure in which lead 23a is covered with the material which does not react with hydrogen sulfide and part of lead 23a is exposed. In FIG. 7, member 25 is overdrawn to describe the installation position of member 25. However, the actual size of member 25 is not necessary to be such a large size.

When hydrogen sulfide is generated at cell 21, electrical resistance of part containing member 25 of lead 23a is changed. By comparing an electrical current value and voltage value after the electrical resistance is changed with the map of the electrical current response to voltage control and the voltage response to electrical current control, the generation of hydrogen sulfide can be detected. If hydrogen sulfide is further generated at cell 21, the flow of an electrical current is halted by the meltdown of lead 23a caused by a resistance increase or heat generation due to resistance, resulted in stopping the electrode reaction. Therefore, corrosion, etc. of the cell pack components caused by hydrogen sulfide gas, which are unavoidable in the conventional art, can be prevented. Thereby, power generation having high safety can be performed.

Figure 8:
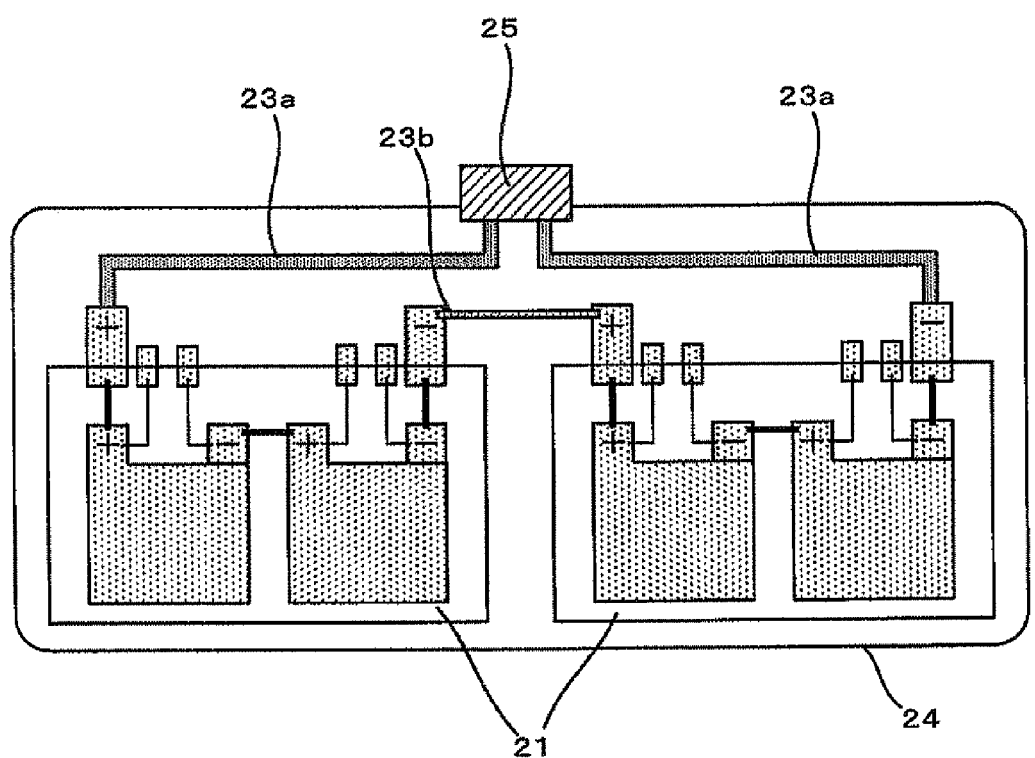
FIG. 8 is a schematic view of a second typical example of the cell pack of the present invention.

FIG. 8 is a schematic view of a second typical example of the cell pack of the present invention. The cell pack of the second typical example is the same as that of the above-described first typical example, except the position of member 25 containing the material which chemically reacts with hydrogen sulfide to change electrical resistance.

In the cell of the second typical example, terminal area 22 of the cell pack contains member 25 containing the material which chemically reacts with hydrogen sulfide to change electrical resistance. In this case, the cell may have a structure in which terminal area 22 is covered with the material which does not react with hydrogen sulfide and part of terminal area 22 is exposed.

When hydrogen sulfide is generated at power generation unit 21, electrical resistance of part containing member 25 of cell terminal 22 is changed. By comparing an electrical current value and voltage value after the electrical resistance is changed with the map of the electrical current response to voltage control and the voltage response to electrical current control, the generation of hydrogen sulfide can be detected. Thereby, power generation having high safety can be performed similarly as in the cell pack of the first typical example.

Figure 9:
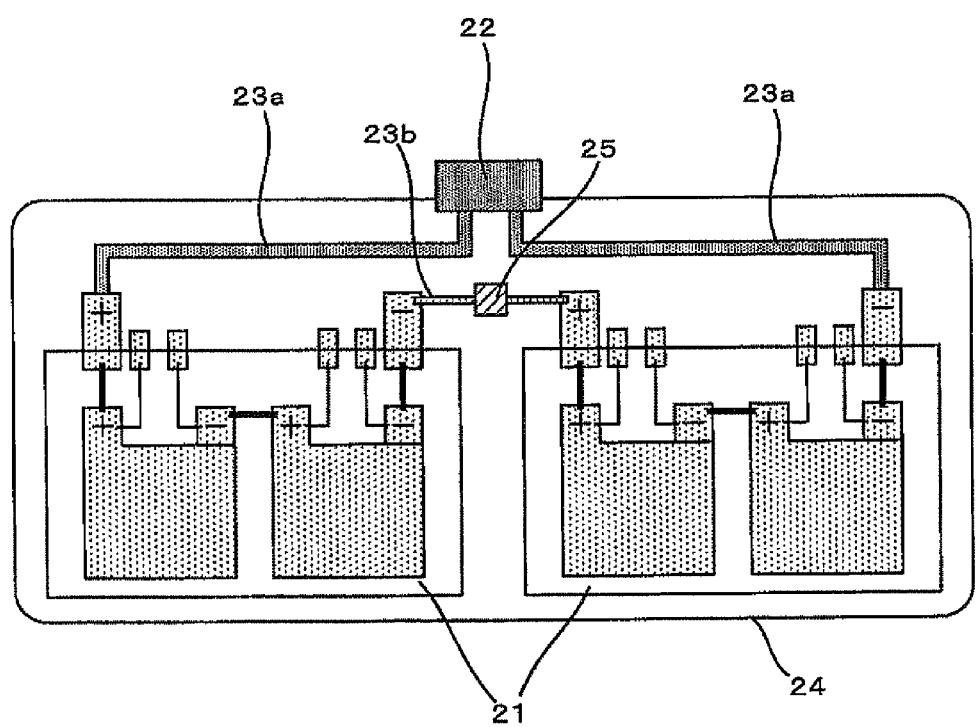
FIG. 9 is a schematic view of a third typical example of the cell pack of the present invention.

FIG. 9 is a schematic view of a third typical example of the cell pack of the present invention. The cell pack of the third typical example is the same as that of the above-described first typical example, except the position of member 25 containing the material which chemically reacts with hydrogen sulfide to change electrical resistance.

In the cell pack of the third typical example, all or part of lead 23b contains member 25 containing the material which chemically reacts with hydrogen sulfide to change electrical resistance. In this case, the cell pack may have a structure in which lead 23b is covered with the material which does not react with hydrogen sulfide and part of lead 23b is exposed. In FIG. 9, member 25 is overdrawn to describe the installation position of member 25. However, the actual size of member 25 is not necessary to be such a large size.

When hydrogen sulfide is generated at cell 21, electrical resistance of part containing member 25 of lead 23b is changed. By comparing an electrical current value and voltage value after the electrical resistance is changed with the map of the electrical current response to voltage control and the voltage response to electrical current control, the generation of hydrogen sulfide can be detected. Thereby, power generation having high safety can be performed similarly as in the cell pack of the first typical example.

Figure 10:
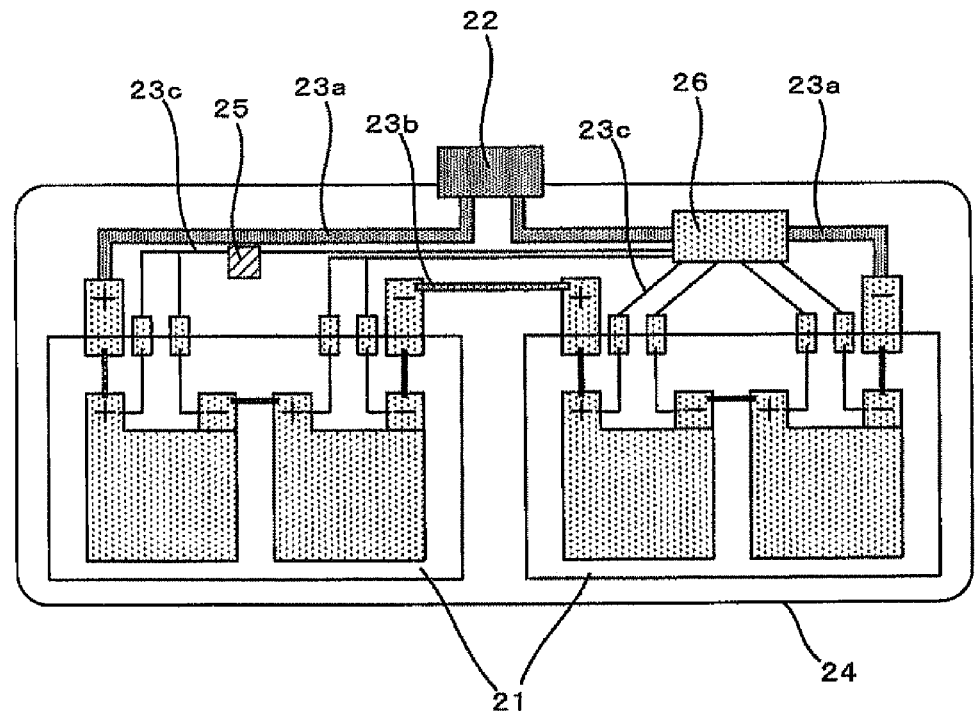
FIG. 10 is a schematic view of a fourth typical example of the cell pack of the present invention.

FIG. 10 is a schematic view of a fourth typical example of the cell pack of the present invention.

The cell pack of the fourth typical example comprises two or more cells 21, each of which has two cell terminals. A first cell terminal of each cell 21 is directly and electrically connected to terminal area 22 of the cell pack by lead 23a. Second cell terminals of cells 21 are directly and electrically connected to one another by lead 23b. The cell pack of the fourth typical example further comprises control circuit 26. Each voltage detecting circuit, etc. of each cell 21 is electrically connected to control circuit 26 by lead 23c. Also in the cell pack of the fourth typical example, components other than part of terminal area 22 of the cell pack are sealed in cell case 24. Herein, as cell 21, the above-described cell in the typical example of the present invention can be used.

In addition, in the cell pack of the fourth typical example, lead 23c contains member 25 containing the material which chemically reacts with hydrogen sulfide to change electrical resistance. In this case, the cell pack may have a structure in which lead 23c is covered with the material which does not react with hydrogen sulfide and part of lead 23c is exposed. In FIG. 10, member 25 is overdrawn to describe the installation position of member 25. However, the actual size of member 25 is not necessary to be such a large size.

When hydrogen sulfide is generated at cell 21, electrical resistance of part containing member 25 of lead 23c is changed. By comparing an electrical current value and voltage value after the electrical resistance is changed with the map of the electrical current response to voltage control and the voltage response to electrical current control, the generation of hydrogen sulfide can be detected. If hydrogen sulfide is further generated at cells 21, the flow of an electrical current is halted by the meltdown of lead 23c caused by a resistance increase or heat generation due to resistance, resulted in stopping the electrode reaction. Therefore, corrosion, etc. of the cell pack components caused by hydrogen sulfide gas, which are unavoidable in the conventional art, can be prevented. Thereby, power generation having high safety can be performed.

3. Vehicle System

The vehicle system of the present invention comprises one or more sulfide-based solid electrolyte cells, one or more sulfide-based solid electrolyte cell packs, or one or more sulfide-based solid electrolyte cells and one or more sulfide-based solid electrolyte cell packs.

Figure 11:
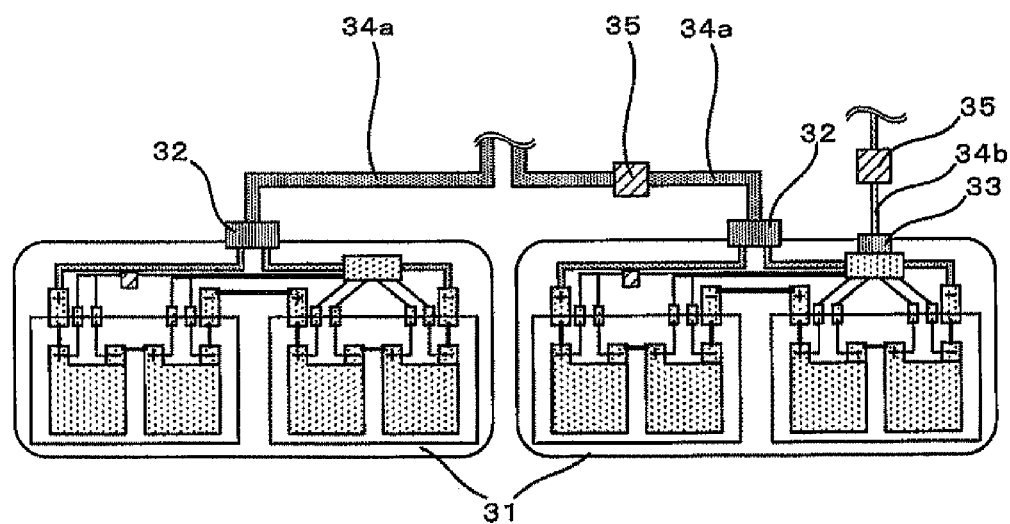
FIG. 11 is a schematic view of a typical example of the vehicle system of the present invention.

FIG. 11 is a schematic view of a typical example of the vehicle system of the present invention. The double wavy line shown in the figure indicates the omission of a part of the figure.

The typical example is a part of a moving vehicle such as a vehicle comprising two or more cell packs 31. Each terminal area 32 of each cell pack is directly and electrically connected to a drive part of the vehicle (not shown in figure) by lead 34a, and control circuit 33 of one of the cell packs is directly and electrically connected to a control part of the vehicle (not shown in figure) by lead 34b. Herein, as cell pack 31, the cell pack in the typical example of the present invention can be used.

In addition, in the vehicle system of the present typical example, lead 34a or lead 34b contains member 35 containing the material which chemically reacts with hydrogen sulfide to change electrical resistance. In this case, the vehicle system may have a structure in which lead 34a or lead 34b is covered with the material which does not react with hydrogen sulfide and part of lead 34a or lead 34b is exposed. In FIG. 11, member 35 is overdrawn to describe the installation position of member 35. However, the actual size of member 35 is not necessary to be such a large size.

When hydrogen sulfide is generated at cell pack 31, electrical resistance of part containing member 35 of lead 34a or lead 34b is changed. By comparing an electrical current value and voltage value after the electrical resistance is changed with the map of the electrical current response to voltage control and the voltage response to electrical current control, the generation of hydrogen sulfide can be detected. If hydrogen sulfide is further generated at cell pack 31, the flow of an electrical current is halted by the meltdown of lead 34a or lead 34b caused by a resistance increase or heat generation due to resistance, resulted in stopping the electrode reaction. Therefore, corrosion, etc. of the cell pack components caused by hydrogen sulfide gas, which are unavoidable in the conventional art, can be prevented. Thereby, power generation having high safety can be performed.

4. Method for Detecting Hydrogen Sulfide

The method for detecting hydrogen sulfide of the present invention is a method for detecting hydrogen sulfide in the sulfide-based solid electrolyte cell, the sulfide-based solid electrolyte cell pack or the vehicle system, the method comprising the steps of:

determining whether a voltage response is normal or not when the sulfide-based solid electrolyte cell is charged or discharged for a predetermined time at a predetermined electrical current, or whether an electrical current response is normal or not when the sulfide-based solid electrolyte cell is charged or discharged for a predetermined time at a predetermined voltage;

determining whether a voltage change or an electrical current change is within a normal range or not when a predetermined electrical current waveform or a predetermined voltage waveform is applied to the sulfide-based solid electrolyte cell upon maintaining the vehicle system or upon producing the sulfide-based solid electrolyte cell, the sulfide-based solid electrolyte cell pack or the vehicle system; and determining whether a difference is present or not upon running the vehicle system between a cell voltage of the sulfide-based solid electrolyte cell upon the running and a cell voltage which is estimated from a cell voltage map according to usage of the sulfide-based solid electrolyte cell in the vehicle system.

The method for detecting hydrogen sulfide of the present invention is effective particularly in the case where part of an electrical current lead or voltage lead contains the member containing material which chemically reacts with hydrogen sulfide to change electrical resistance. Particularly in the case that part of the voltage lead contains the member, there is an increase in electrical resistance upon the generation of hydrogen sulfide, so that it is impossible to detect voltage. Therefore, the purpose of hydrogen sulfide detection can be sufficiently achieved.

In the present invention, as a criterion for determining whether the voltage response is normal or not when charging or discharging for a predetermined time at a predetermined electrical current, or whether the electrical current response is normal or not when charging or discharging for a predetermined time at a predetermined voltage, for example, there may be mentioned the case where the voltage when charging or discharging for the predetermined time is 20% or more higher or lower compared with the initial charging and discharging voltage.

In the present invention, as the case where the voltage change or the electrical current change is not within the normal range, for example, there may be mentioned a case where a decreasing or increasing rate of the charging and discharging voltage is faster than a rate of deterioration in the cell.

In the present invention, as the cell voltage map according to usage of the sulfide-based solid electrolyte cell in the vehicle system, for example, there may be mentioned a map produced by the result of the test or simulation which is preliminarily performed.

Figure 13:
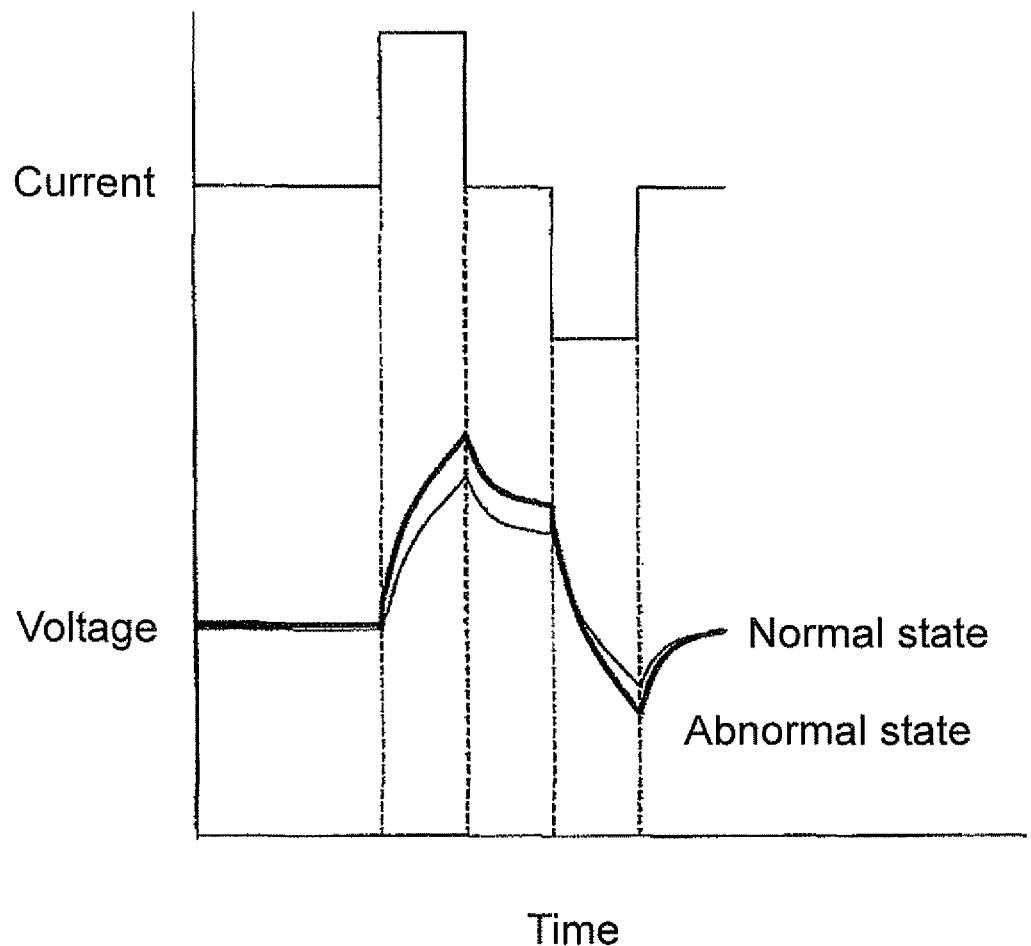
FIG. 13 is a graph showing an example of voltage change accompanying current change in a cell, and it is also a graph showing a voltage behavior of the cell in a normal state and that in an abnormal state in the case of using the method for detecting hydrogen sulfide of the present invention.

FIG. 13 is a graph showing an example of voltage change accompanying current change in a cell, and it is also a graph showing a voltage behavior of the cell in a normal state and that in an abnormal state in the case of using the method for detecting hydrogen sulfide of the present invention.

As shown in FIG. 13, the amplitude of a voltage behavior in the abnormal state is larger than that of a voltage behavior in the normal state. This reason is as follows: there is an increase in resistance of the member containing the material which chemically reacts with hydrogen sulfide to change electrical resistance, the member is installed in the charging and discharging path of the cell, cell pack or vehicle system, resulting in an increase in voltage upon charge and voltage effect upon discharge.

By preliminarily preparing the cell voltage map according to usage of the sulfide-based solid electrolyte cell in the vehicle system, as shown in the thin line graph of FIG. 13, it is constantly monitored whether a difference is present or not between the cell voltage estimated from the cell voltage map and the cell voltage of the sulfide-based solid electrolyte cell upon running the vehicle system, so that the presence of the leak of hydrogen sulfide can be determined.

EXAMPLES

1. Production of All-Solid Lithium Secondary Cell

Example 1

First, as a material for a positive electrode active material layer, $LiCoO_2$ was mixed with $Li_2S$—$P_2S_5$ being a kind of a sulfide-based solid electrolyte in a volume ratio of 1:1 to prepare a mixture. Also, as a positive electrode current collector, an aluminum foil was prepared. The material for the positive electrode active material layer was applied to an area of 100×100 mm on one surface of the positive electrode current collector to complete a positive electrode.

Next, as a material for a negative electrode active material layer, a graphite carbon was mixed with $Li_2S$—$P_2S_5$ being a kind of a sulfide-based solid electrolyte in a volume ratio of 1:1 to prepare a mixture. Also, as a negative electrode current collector, a SUS foil was prepared. The material for the negative electrode active material layer was applied to an area of 100×100 mm on one surface of the negative electrode current collector to complete a negative electrode.

Then, as a solid electrolyte, $Li_2S$—$P_2S_5$ being a kind of a sulfide-based solid electrolyte was prepared. The solid electrolyte was applied on the surface of the negative electrode, on which the negative electrode active material layer was applied, so as to cover the negative electrode active material layer. On the surface of thus obtained stack comprising the solid electrolyte, the negative electrode active material layer and the negative electrode current collector, on which the solid electrolyte was applied, the positive electrode was stacked so as to face the positive electrode active material layer side. Thereby, a power generation unit of an all-solid lithium secondary battery was completed.

Next, on uncoated area of each of the positive and negative electrode active materials in each of the positive and negative electrode current collectors of the above-described power generation unit, a copper tab (width: 5 mm; length: 130 mm; thickness: 0.5 mm) was welded. As the connection of a cell terminal, a terminal made of SUS was welded at the end of the copper tab.

The power generation unit, copper tab and terminal made of SUS were laminated and sealed. Thereby, a cell of Example 1 was completed.

Example 2

The production process of the power generation unit of the all-solid lithium secondary battery in Example 2 was the same as that of Example 1.

Next, on uncoated area of each of the positive and negative electrode active materials in each of the positive and negative electrode current collectors of the above-described power generation unit, a SUS tab (width: 5 mm; length: 130 mm; thickness: 0.1 mm) was welded. In addition, an uncovered copper wire having a thickness of 0.3 mm was connected between the SUS tab and a voltage detecting terminal made of SUS by means of a solder.

The power generation unit, SUS tab, voltage detecting terminal made of SUS and terminal made of SUS were laminated and sealed. Thereby, a cell of Example 2 was completed.

2. Operation Test of All-Solid Lithium Secondary Cell

The operation test of the cell obtained in each of Example 1 and Example 2 was performed. The operation test was performed by measuring the cell obtained in each of Example 1 and Example 2 at 3.8V by means of an impedance analyzer (model 1260; manufactured by: Solartron Analytical).

First, 150 mL of air (70% relative humidity) was injected into the laminate of the cell in Example 1 using a syringe to mimic deterioration, and DC resistance measured by the AC impedance method was increased from 27 mΩ to 58 mΩ.

Next, 150 mL of air (70% relative humidity) was injected into the laminate of the cell in Example 2 to mimic deterioration, and the voltage was not able to be detected.

As a result of the above operation test, it was confirmed in the cell of the present invention having the copper tab or copper wire as the material which chemically reacts with hydrogen sulfide to change electrical resistance that the electrical resistance of the member responsible for power collection was changed in the case where the sulfide-based solid electrolyte was reacted with moisture inside or outside the cell to generate hydrogen sulfide. Therefore, the generation of hydrogen sulfide was easily detected, thereby preventing a deterioration in the cell caused by hydrogen sulfide.

3. Measurement of Resistivity Change in Copper Foil Exposed in Hydrogen Sulfide Measurement of resistivity change in the copper foil exposed in hydrogen sulfide was performed. First, the sulfide-based solid electrolyte and the copper foil were placed in a container and left in air for a predetermined period of time, followed by sealing the container. It is considered that part of the sulfide-based solid electrolyte is decomposed by moisture in the air left in the container, and the container is filled with hydrogen sulfide. Therefore, the state that the copper foil is left in the container for a long time is regarded as the state that the copper foil is left in hydrogen sulfide.

The resistivity of each of the copper foil left in hydrogen sulfide for 120 minutes or 600 minutes and the copper foil which was not exposed in hydrogen sulfide was measured by means of a four-pin probe electrical resistance meter (product name: 1116SLD; manufactured by: BAS Inc.).

Figure 12:
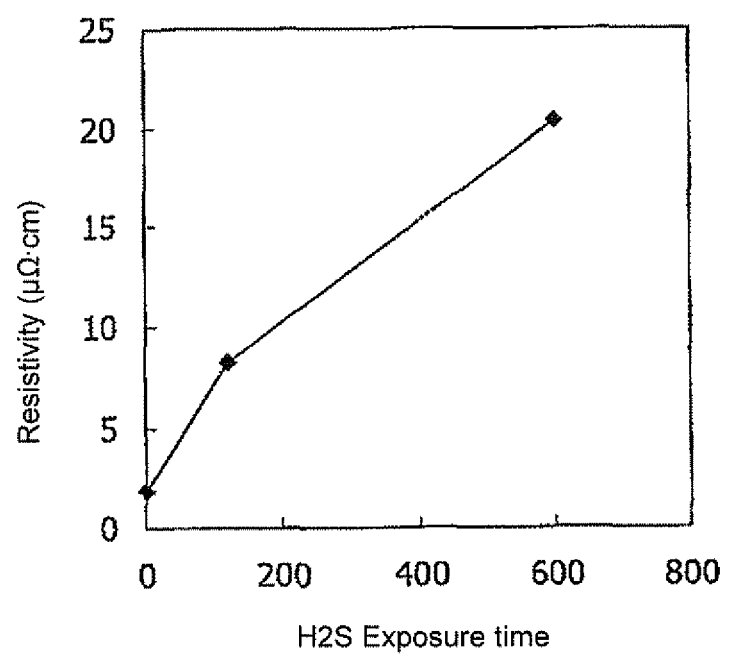
FIG. 12 is a line graph representing resistivity change in a copper foil exposed in hydrogen sulfide.

FIG. 12 is a line graph showing the resistivity change in the copper foil exposed in hydrogen sulfide, a vertical axis showing resistivity ($\mu\Omega \cdot cm$) and a horizontal axis showing exposure time in hydrogen sulfide (min.). As shown in the figure, while the resistivity of the copper foil not exposed in hydrogen sulfide was 1.85 $\mu\Omega \cdot cm$, the resistivity of the copper foil exposed in hydrogen sulfide for 120 minutes was 8.2 $\mu\Omega \cdot cm$, and the resistivity of the copper foil exposed in hydrogen sulfide for 600 minutes was 20.4 $\mu\Omega \cdot cm$.

This result shows that by exposing the copper foil in hydrogen sulfide, the resistivity was increased in rough proportion to the exposure time.

REFERENCE SIGNS LIST

1: Lithium ion-conducting solid electrolyte
2: Positive electrode active material layer
3: Negative electrode active material layer
4: Positive electrode current collector
5: Negative electrode current collector
6: Positive electrode
7: Negative electrode
11: Power generation unit
12: Cell terminal
13a: Lead which directly and electrically connects between cell terminal and one of electrodes of power generation unit
13b: Lead which directly and electrically connects between electrodes of power generation unit
13c: Lead which directly and electrically connects voltage detecting circuit or voltage equalization circuit and one of electrodes of power generation unit
14: Cell case
15: Member containing material which chemically reacts with hydrogen sulfide to change electrical resistance
16: Voltage detecting circuit or voltage equalization circuit
21: Cell
22: Terminal area of cell pack
23a: Lead which directly and electrically connects between cell terminal of cell and terminal area of cell pack
23b: Lead which directly and electrically connects between cell terminals of cell
23c: Lead which directly and electrically connects between control circuit and voltage detecting circuit, etc. of cell
24: Cell case
25: Member containing material which chemically reacts with hydrogen sulfide to change electrical resistance
26: Control circuit
31: Cell pack
32: Terminal area of cell pack
33: Control circuit of cell pack
34a: Lead which directly and electrically connects between terminal area of cell pack and drive part of vehicle
34b: Lead which directly and electrically connects between control circuit of cell pack and control part of vehicle
35: Member containing material which chemically reacts with hydrogen sulfide to change electrical resistance
100: All-solid lithium secondary battery

The invention claimed is:

1. A vehicle system comprising at least a sulfide-based solid electrolyte cell which comprises at least a power generation unit comprising a positive electrode, a negative electrode and an electrolyte present between the positive and negative electrodes, and a cell case which houses the power generation units,
   wherein at least one of the positive electrode, the negative electrode and the electrolyte comprises a sulfur material, and
   wherein at least one of a current collector which constitutes a charging and discharging path, a lead which constitutes a charging and discharging path, and a lead which is connected to a circuit that is attached to the charging and discharging path, comprises a material which chemically reacts with hydrogen sulfide to change electrical resistance; and
   the vehicle system comprising a unit for detecting hydrogen sulfide controlled to determine whether hydrogen sulfide is generated or not based on a voltage response upon charging or discharging the sulfide-based solid electrolyte cell for a predetermined time at a predetermined electrical current, or an electrical current response upon charging or discharging the sulfide-based solid electrolyte cell for a predetermined time at a predetermined voltage.

2. The vehicle system according to claim 1, wherein the unit for detecting hydrogen sulfide is controlled to determine whether a difference is present or not upon running the vehicle system between a cell voltage of the sulfide-based solid electrolyte cell upon the running and a cell voltage which is estimated from a cell voltage map according to usage of the sulfide-based solid electrolyte cell in the vehicle system.

3. The vehicle system according to claim 1, wherein the material which chemically reacts with hydrogen sulfide to change electrical resistance is a metal selected from the group consisting of copper, nickel, iron, molybdenum, gold, silver, silicon, germanium, samarium, zirconium, tin, tantalum, lead, niobium, neodymium, platinum, hafnium, palladium, magnesium, manganese and lanthanum, or an alloy that is a combination thereof.

4. The vehicle system according to claim 1, wherein the lead which constitutes the charging and discharging path is a lead which connects the power generation units, and the lead which is connected to the circuit attached to the charging and discharging path is a lead which connects the power generation unit and the attached circuit.

5. The vehicle system according to an claim 1, wherein the current collector which constitutes the charging and discharg-ing path, the lead which constitutes the charging and discharging path, or the lead which is connected to the circuit attached to the charging and discharging path is a current collector or lead which is present in a range that hydrogen sulfide generated from the power generation unit reaches.

6. A method for detecting hydrogen sulfide in a sulfide-based solid electrolyte cell comprising the step of:

determining whether hydrogen sulfide is generated or not based on a voltage response upon charging or discharging the sulfide-based solid electrolyte cell for a predetermined time at a predetermined electrical current, or an electrical current response upon charging or discharging the sulfide-based solid electrolyte cell for a predetermined time at a predetermined voltage, the sulfide-based solid electrolyte cell which comprises at least a power generation unit comprising a positive electrode, a negative electrode and an electrolyte present between the positive and negative electrodes, and a cell case which houses the power generation units, wherein at least one of the positive electrode, the negative electrode and the electrolyte comprises a sulfur material, and wherein at least one of a current collector which constitutes a charging and discharging path, a lead which constitutes a charging and discharging path, and a lead which is connected to a circuit that is attached to the charging and discharging path, comprises a material which chemically reacts with hydrogen sulfide to change electrical resistance.

7. The method for detecting hydrogen sulfide according to claim 6, wherein the determining step is a step for determining whether a voltage change or an electrical current change is within a normal range or not when a predetermined electrical current waveform or a predetermined voltage waveform is applied to the sulfide-based solid electrolyte cell upon maintaining the vehicle system or upon producing the vehicle system, the sulfide-based solid electrolyte cell or a sulfide-based solid electrolyte cell pack comprising at least the sulfide-based solid electrolyte cell.

* * * * *